Jan. 18, 1944.  L. H. BRITTON  2,339,455
CLOSURE
Filed July 12, 1941
Fig. 1.
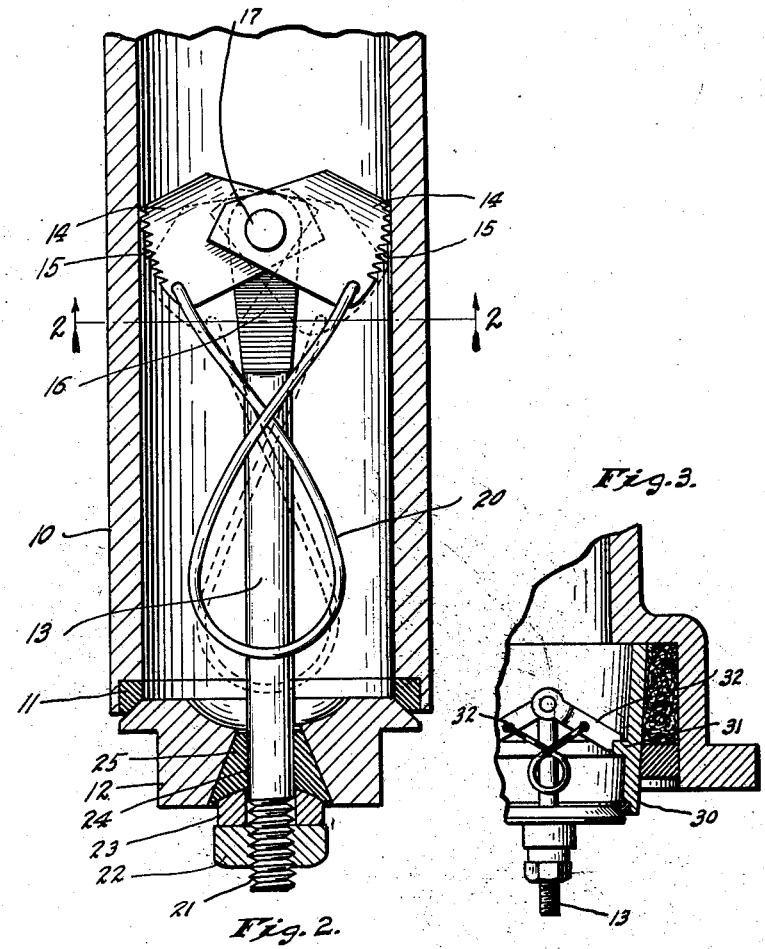
Fig. 3.
Fig. 2.
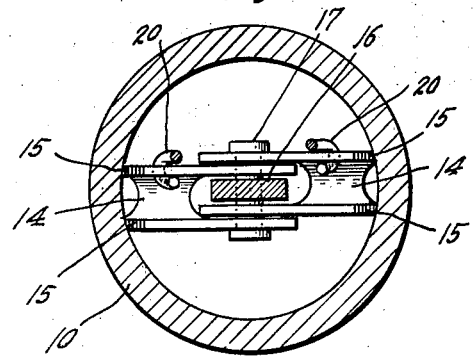
INVENTOR.
LOYAL HARLEY BRITTON
BY
ATTORNEYS.

Patented Jan. 18, 1944

2,339,455

UNITED STATES PATENT OFFICE 2,339,455

CLOSURE

Loyal H. Britton, Indianapolis, Ind.

Application July 12, 1941, Serial No. 402,145

2 Claims. (Cl. 220—25)

My invention relates to closures adapted to be used as substitutes for and improvements over pipe-caps and plugs. It frequently happens that screw-threaded pipe-caps or plugs used to close the open ends of pipes or openings in pipe-fittings, or in other situations, become rusty or corroded, with the result that they frequently can not be removed without damaging the cap or plug or the pipe or fitting with which it is associated. After damage of this kind has occurred, it then becomes difficult to re-close the opening.

It is the object of my invention to provide a closure which can be used in place of a pipe-cap or plug to close openings in the ends of pipes or in pipe fittings or in other similar situations, which closure will not require the provision of screw-threads on the part in which the opening to be closed is located, but which nevertheless will provide a tight and effective seal. A further object of my invention is to produce a closure which can be used equally satisfactorily for purposes of repair or of original installation.

In carrying out my invention, I provide a closure member adapted to fit against the edge of the opening to be sealed or against a gasket associated with such opening, such closure being provided with a central opening for the reception of the shank of a tightening bolt. Upon the inner end of this bolt there are pivotally mounted a pair of dogs whose free ends are adapted to engage the inner surface of the pipe, fitting, or other member in which is located the opening to be closed, such dogs desirably being biased as by the use of a spring to cause their free ends to engage such inner surface. The outer end of the bolt is screw-threaded for the reception of a nut which reacts against the closure, and the arrangement of the dogs is such that tightening of the nut not only seats the closure but also tends to force the free ends of the dogs outwardly into firm gripping engagement with said inner surface.

The accompanying drawing illustrates my invention: Fig. 1 is an axial section through a pipe or tubing the end of which is closed by my improved closure; Fig. 2 is a transverse section on the line 2—2 of Fig. 1; Fig. 3 is a view similar to Fig. 1 illustrating a modification.

In Fig. 1, I have indicated at 10 a pipe or tube the end of which is to be closed. As shown, the end of the pipe 10 is counterbored for the reception of a gasket 11. A closure member 12, which desirably has a frusto-conical gasket-engaging face, is provided centrally with an opening for the reception of a tightening bolt 13 which extends into the pipe 10 and which has a pair of dogs 14 pivotally mounted on its inner end. The free end of each dog 14 is adapted to engage the inner surface of the pipe 10 and is shaped eccentrically to the axis of pivotal attachment to the bolt so that outward movement of the bolt relative to the pipe will tend to increase the force with which the dogs engage the inner surface of the pipe. Preferably, the pipe-engaging surfaces of the dogs 14 are serrated as indicated at 15 to provide a more effective gripping engagement.

Desirably, the two dogs 14 are identical in shape and are formed of sheet-metal bent into U-shaped cross-section and case hardened, at least at their outer ends. As shown, the inner end of the bolt 13 may be flattened to provide a head 16, such head and the two side walls of each dog being provided with openings for the reception of a pivot pin 17. By making the two dogs identical, costs of production are decreased; and by making them of U-shaped cross-section each dog possesses two serrated edges for engagement with the inner surface of the pipe. In order that the two identical dogs may be mounted on the common pivot pin 17, they are offset in opposite directions with respect to the bolt, as will be clear from Fig. 2.

The two dogs 14 are biased outwardly to cause their serrated edges to engage the pipe. Conveniently, this result is obtained through the use of a looped wire spring 20 the ends of which are bent to enter holes provided in one wall of each of the dogs 14, as will be apparent from Fig. 2. The wire spring 20 is so shaped that its ends bear outwardly on the respective dogs 14 and tend to rotate them about the pivot 17 in a direction which will cause the serrated edges 15 to engage the inner surface of the pipe. The spring 20 extends outwardly along the bolt 13, its looped end desirably being located adjacent the end of the pipe 10 for a purpose which will hereinafter become apparent.

The outer end of the bolt 13 is screw-threaded as indicated at 21 for the reception of a tightening nut 22 by means of which the closure 12 can be firmly seated in contact with the gasket 11. Desirably, the nut 22 does not directly engage the closure 12 but instead engages a washer or collar 23 which in turn engages a frusto-conical gasket 25 of soft metal mounted in the closure and having a central opening 24; and the central opening in the closure 12 is tapered complementarily to such gasket, so that as the nut is tightened the gasket 25 will form a tight seal not only against the closure but also around the bolt.

In using the device illustrated in Fig. 1, the closure 12, washer 23, and nut 22 are mounted on the end of the bolt 13, and the inner end of such bolt, bearing the dogs 14, is inserted into the pipe 10. Friction between the free ends of the dogs 14 and the inner surface of the pipe 10 as the bolt is inserted into the pipe tends to cause the dogs to swing outwardly about the axis of the pin 17; and, since the free ends of the dogs are eccentric relative to the axis of the pin 17, this tendency relieves the pressure with which the dogs bear against the inner surface of the pipe. As a result, the dogs do not interfere with insertion of the bolt into the pipe.

When the bolt 13 has been inserted far enough into the pipe to cause engagement of the closure with the gasket 11, the nut 22 is then tightened. This tightening of the nut 22 tends to draw the bolt 13 outwardly; and, as the dogs 14 are held in frictional engagement with the inner surface of the pipe 10 by the spring 20, the dogs tend to rotate rearwardly about the axis of the pin 17. Because of the eccentric shape of the serrated edges 15, this tendency of the dogs to rotate causes them to grip the inner surface of the pipe 10 more firmly and causes the hardened serrations 15 to become imbedded in the wall of the pipe, thus limiting outward movement of the bolt 13. As tightening of the nut 22 is continued, the closure 12 is forced firmly against the gasket 11 to provide an effective seal. Simultaneously, the washer 23, is forced against the gasket 25 to provide a seal around the bolt 13.

The gaskets 11 and 25 are desirably of lead or other soft metal capable of distortion under the pressures imposed upon them. The bolt-receiving hole 24 may originally be somewhat larger than the bolt in order that any lack of perpendicularity between the plane of the gasket 11 and the axis of the pipe 10 will not interfere with firm fitting of the closure 12 upon the gasket. Tightening of the nut 22 will cause the soft metal of the gasket 25 to flow against the bolt 13, thus providing an effective seal even if the hole in the gasket is originally larger than the bolt.

To remove the closure illustrated in Fig. 1, the nut 22, the washer 23, and the closure 12 are removed from the bolt. It is then possible, as by placing the thumb over the outer end of the bolt and a finger within the loop of the spring 20, to draw the spring forwardly relatively to the bolt, thus distorting the spring and moving the inner ends of the dogs 14 inwardly to the dotted-line positions shown in Fig. 1, where they will be out of contact with the inner surface of the pipe 10 and will not interfere with removal of the bolt from the pipe.

The closure illustrated in Figs. 1 and 2 may be used as original equipment or for purposes of emergency repair. In the latter case, the only operation it is necessary to perform upon the pipe 10 before using the closure is to counterbore or to face its end surface by the use of equipment of well known type to provide a seat for a gasket against which the closure 12 may bear.

In Fig. 3 I have illustrated a clean-out fitting for a soil pipe, such fitting being adapted for the incorporation of my closure as original equipment. In such an arrangement the fitting 30 may be provided interiorly with an annular flange 31 spaced inwardly from the opening to be closed; and dogs 32 pivotally mounted on the inner end of the bolt 13 may have their outer ends shaped to co-operate with this flange in such a manner that when the closure is in place the axis on which the dogs are pivotally connected to the bolt 13 will be displaced inwardly from the flange 31. As the result of this arrangement, outward pull on the bolt 13 will tend to force the free ends of the dogs 32 outwardly and hold them firmly seated against the flange 31. In this instance, however, the outward pressure exerted by the dogs 32 upon the inner surface of the fitting need not be so great as in the device shown in Fig. 1; for the outward axial force applied to the bolt 13 will be transmitted to the fitting 30 through the flange 31, which provides an abutment positively limiting outward movement of the dogs 32.

I claim as my invention:

1. In a device of the type described, a closure member having a central opening, a bolt disposed in said opening, said bolt having a screw-threaded end, a pair of dogs pivotally mounted on the opposite end of said bolt, each of said dogs being formed of sheet metal bent into a general U-shaped cross-section with the parallel walls of the dog normal to the axis of pivotal mounting of the dog on the bolt and with the open side of each dog facing the screw-threaded end of said bolt, a nut on the screw-threaded end of said bolt, and a looped wire spring having its ends secured respectively to said dogs and biasing them outwardly, the intermediate portion of said spring extending along said bolt toward said closure and being movable toward the screw-threaded end of said bolt to draw the outer ends of said dogs inwardly.

2. In a device of the type described, a closure member having a central opening, a bolt disposed in said opening, said bolt having a screw-threaded end, a pair of dogs pivotally mounted on a common axis on the opposite end of said bolt, a looped wire spring having its ends secured respectively to said dogs and biasing them outwardly, the intermediate portion of said spring extending along said bolt toward said closure and being movable toward the screw-threaded end of said bolt to draw the outer ends of said dogs inwardly, and a nut on the screw-threaded end of said bolt.

LOYAL H. BRITTON.